US009668207B2

(12) United States Patent
Östergaard et al.

(10) Patent No.: US 9,668,207 B2
(45) Date of Patent: May 30, 2017

(54) DECIDING WHETHER TO SEND UPLINK CONTROL SIGNALING BASED ON THE ACTIVE TIME STATUS OF A USER EQUIPMENT CONFIGURED WITH DISCONTINUOUS RECEPTION (DRX)

(75) Inventors: Jessica Östergaard, Stockholm (SE); Mikael Wittberg, Uppsala (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 14/238,393

(22) PCT Filed: May 9, 2012

(86) PCT No.: PCT/SE2012/050490
§ 371 (c)(1),
(2), (4) Date: Feb. 11, 2014

(87) PCT Pub. No.: WO2013/025147
PCT Pub. Date: Feb. 21, 2013

(65) Prior Publication Data
US 2014/0198701 A1 Jul. 17, 2014

Related U.S. Application Data

(60) Provisional application No. 61/522,981, filed on Aug. 12, 2011.

(51) Int. Cl.
H04W 28/18 (2009.01)
H04W 52/02 (2009.01)
H04W 76/04 (2009.01)

(52) U.S. Cl.
CPC ..... *H04W 52/0209* (2013.01); *H04W 76/048* (2013.01)

(58) Field of Classification Search
CPC .......... H04W 52/0209; H04W 76/048
See application file for complete search history.

(56) References Cited

U.S. PATENT DOCUMENTS

2008/0165698 A1  7/2008  Dalsgaard et al.
2008/0268863 A1  10/2008  Pedersen et al.
(Continued)

FOREIGN PATENT DOCUMENTS

EP    2355602 A1    8/2011
JP    2010050579 A  3/2010
(Continued)

OTHER PUBLICATIONS

Author Unknown, "CSI/SRS Reporting During DRX," Panasonic; 3GPP TSG-RAN WG2 Meeting #74; R2-112807. May 9-13, 2011. pp. 1-2. Barcelona, Spain.
(Continued)

*Primary Examiner* — Omar Ghowrwal
(74) *Attorney, Agent, or Firm* — Murphy, Bilak & Homiller, PLLC

(57) ABSTRACT

A method in a user equipment for deciding whether or not to send an uplink transmission (ie. Channel State Information, CSI, and/or Sounding Reference Signal, SRS) to a radio access network node (Node B) is provided. The user equipment and radio access network node (Node B) are comprised in a communications network. The user equipment is configured with Discontinuous Reception, DRX, to be in active time or not be in active time. The user equipment decides (201) whether or not to send the uplink transmission at a transmission time t, based on whether the user equipment was in active time or not at a predefined earlier time instance relative to the transmission time t.

20 Claims, 3 Drawing Sheets

(56) References Cited

U.S. PATENT DOCUMENTS

| | | | |
|---|---|---|---|
| 2011/0038271 A1 | 2/2011 | Shin et al. | |
| 2011/0038277 A1 | 2/2011 | Hu et al. | |
| 2011/0134774 A1 | 6/2011 | Pelletier et al. | |
| 2012/0033595 A1* | 2/2012 | Aoyama | H04W 76/048 370/311 |
| 2013/0208672 A1* | 8/2013 | Papasakellariou et al. | 370/329 |
| 2013/0242911 A1* | 9/2013 | Heo et al. | 370/329 |

FOREIGN PATENT DOCUMENTS

| | | | |
|---|---|---|---|
| JP | 2010528557 A | 8/2010 | |
| WO | WO 2009132523 A1 * | 11/2009 | H04W 52/42 |
| WO | WO 2010122771 A1 * | 10/2010 | H04W 76/048 |
| WO | 2011063244 A2 | 5/2011 | |
| WO | 2011085230 A2 | 7/2011 | |

OTHER PUBLICATIONS

Author Unknown, "Change Request—CSI/SRS Reporting During DRX," Panasonic. 3GPP TSG-RAN-WG2 Meeting #74; R2-112808. Change Request 36.321 CR, rev., 10.1.0; May 9-13, 2011. pp. 1-3. Barcelona, Spain.

Author Unknown, "Draft Report of 3GPP TSG RAN WG2 Meeting #74, Barcelona, Spain, May 9-13, 2011," ETSI MCC; TSG-RAN Working Group 2 Meeting #75; R2-113701, V1.0. Aug. 22-26, 2011. pp. 1-175. Athens, Greece.

Author Unknown, "[Marked] Draft Report of 3GPP TSG RAN WG2 Meeting #7, Barcelona, Spain, May 9-13, 2011," ETSI MCC; TSG-RAN Working Group 2 meeting #75; R2-113701; Aug. 22-26, 2011. pp. 1-179. Athens, Greece.

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.1.0, Mar. 2011, 1-115.

3GPP, "3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.2.0, May 2008, 1-33.

3GPP, "3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.1.0, Mar. 2011, 1-53.

3GPP, "3rd Generation Partnership Project; Technical Specification Group Radio Access Network; Evolved Universal Terrestrial Radio Access (E-UTRA); Physical layer procedures (Release 8)", 3GPP TS 36.213 V8.8.0 (Sep. 2009), Sep. 2009, 1-77.

* cited by examiner

DECIDING WHETHER TO SEND UPLINK CONTROL SIGNALING BASED ON THE ACTIVE TIME STATUS OF A USER EQUIPMENT CONFIGURED WITH DISCONTINUOUS RECEPTION (DRX)

TECHNICAL FIELD

Embodiments herein relate to a user equipment and methods therein. In particular, it relates to deciding whether or not to send an uplink transmission to a radio access network node.

BACKGROUND

Mobile Communications Systems

In a typical cellular radio system, wireless terminals, also known as mobile stations and/or User Equipments (UEs), communicate via a Radio Access Network (RAN) to one or more core networks. The radio access network covers a geographical area which is divided into cell areas. Each cell area is served by a base station, e.g., a Radio Base Station (RBS), which in some networks may also be called, for example, a "NodeB" in Universal Mobile Telecommunications System (UMTS) or "eNodeB" Long Term Evolution (LTE). A cell is a geographical area where radio coverage is provided by the radio base station equipment at a base station site. The base stations communicate over the air interface operating on radio frequencies with the user equipments within range of the base stations.

In some versions of the radio access network, several base stations are typically connected, e.g., by landlines or microwave, to a controller node, such as a Radio Network Controller (RNC) or a Base Station Controller (BSC), which supervises and coordinates various activities of the plural base stations connected thereto. The radio network controllers are typically connected to one or more core networks.

The UMTS is a third generation mobile communication system, which evolved from the second generation (2G) Global System for Mobile Communications (GSM). The UMTS terrestrial radio access network (UTRAN) is essentially a radio access network using wideband code division multiple access for user equipments. In a forum known as the Third Generation Partnership Project (3GPP), telecommunications suppliers propose and agree upon standards for third generation networks and UTRAN specifically, and investigate enhanced data rate and radio capacity. Specifications for the Evolved Packet System (EPS) have been completed within the 3rd 3GPP to be continued in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNC nodes. In general, in E-UTRAN/LTE the functions of an RNC node are distributed between the radio base stations nodes, e.g., eNodeBs in LTE, and the core network. As such, the RAN of an EPS system has an essentially "flat" architecture comprising radio base station nodes that are not controlled by the RNC nodes.

Discontinuous Reception DTX

Long Term Evolution (LTE) supports Discontinuous Reception (DRX) to enable a user equipment power savings by turning off some or all of the radio circuitry of the user equipment, thereby increasing the battery life time of the user equipment. The DRX function is configured and controlled by the radio access network. The user equipment behavior with respect to DRX is based on a set of rules that define when the user equipment shall monitor a Physical Downlink Control Channel (PDCCH) for scheduling grants and assignments and when the user equipment shall and shall not transmit certain uplink control signaling and uplink sounding reference signals. The DRX function is characterized by a DRX cycle and a number of timers that decide if the user equipment is in active time or not. These timers include the on-duration timer, an inactivity timer, and a retransmission timer. The user equipment monitors the PDCCH at the beginning of every DRX cycle for the entire on-duration period and additionally stays awake according to the DRX timers. Whenever the user equipment receives an assignment or grant indicating a new transmission from the radio access network, it starts or restarts the inactivity timer and continues to monitor the PDCCH until the timer expires. Moreover, to ensure the Hybrid Automatic Repeat Request (HARQ) operation, the user equipment also listens for grants for possible retransmissions in UL and for possible retransmissions in DL as soon as a retransmission can be expected. There are also periods when the user equipment is in active time after transmission of a scheduling request and during parts of the random access procedure.

According to LTE Medium Access Control (MAC) 36.213 Release 8, when DRX is configured, the user equipment shall for each subframe:

During the Active Time, for a PDCCH-subframe, if the subframe is not required for uplink transmission for half-duplex FDD UE operation and if the subframe is not part of a configured measurement gap:—Monitor the PDCCH. Half-duplex FDD is when a subframe is used for the user equipment to switch between transmit and receive, i.e. same circuitry is used for both DL and UL.

The MAC protocol is a protocol that handles e.g. scheduling information and HARQ. DRX hence primarily regulates the downlink monitoring of the user equipment. For further battery saving, however, periodic uplink control signaling such as periodic Channel State Information (CSI) reporting and periodic Sounding Reference Signals (SRS) is also limited by DRX. Sounding reference signals (SRS) are transmitted to enable improved channel estimation According to LTE MAC, when DRX is configured, the user equipment shall for each subframe.

When not in Active Time, type-0-triggered SRS shall not be reported. Type-0-triggered SRS=periodic sounding reference signal.

If Channel Quality Indication (CQI) masking, also referred to as cqi-Mask, is setup by upper layers, in this case upper layer is RRC, when on duration timer is not running, CQI, Precoding Matrix Indicator (PMI), Rank Indication (RI) and/or Precoder Type Indication (PTI) on Physical Uplink Control Channel (PUCCH) shall not be reported. The onDurationTimer together with the start of the DRX cycle decide the on duration period. That is, if on DurationTimer=4, e.g., the on Duration period will be from the start of the DRX cycle and 4 subframes onwards.

Else:—when not in Active Time, CQI/PMI/RI/PTI on PUCCH shall not be reported.

Active Time

Active time for the user equipment is defined by a number of timers and conditions:

According to MAC LTE, when a DRX cycle is configured, the Active Time includes the time while:

- on duration timer or DRX-inactivity timer or DRX-retransmission timer or mac-contention resolution timer, as described in sub clause 5.1.5, in the LTE MAC specification, is running; or
- a Scheduling Request is sent on PUCCH and is pending, as described in subclause 5.4.4 in the LTE MAC specification; or
- an uplink grant for a pending HARQ retransmission can occur and there is data in the corresponding HARQ buffer; or
- a PDCCH indicating a new transmission addressed to a Cell Radio Network Temporary ID (C-RNTI) of the user equipment has not been received after successful reception of a Random Access Response for a preamble not selected by the user equipment, as described in sub clause 5.1.4 in the LTE MAC specification. The preamble may be referred to as a Random access preamble.

The starting and stopping of timers is specified in the LTE MAC specification cited above:

According to the LTE MAC protocol, when DRX is configured, the user equipment shall for each subframe:

If a HARQ RTT Timer expires in this subframe and the data in the soft buffer of the corresponding HARQ process was not successfully decoded, —start a DRX-Retransmission Timer for a corresponding HARQ process.

If a DRX Command MAC control element is received, —stop the on duration timer, and—stop the DRX-Inactivity Timer.

If drx-InactivityTimer expires or a DRX Command MAC control element is received in this subframe:

If the Short DRX cycle is configured, —start or restart drxShortCycleTimer; and—use the Short DRX Cycle.

Else, use the Long DRX cycle.

If a DRX Short Cycle Timer expires in this subframe, —use the Long DRX cycle.

if the Short DRX Cycle is used and [(SFN*10)+subframe number] modulo (shortDRX-Cycle)=(drxStartOffset) modulo (shortDRX-Cycle); or If the Long DRX Cycle is used and [(SFN*10)+subframe number] modulo (long DRX-Cycle)=DRX Start Offset, —start on duration timer;

during the Active Time, for a PDCCH-subframe, if the subframe is not required for uplink transmission for half-duplex FDD UE operation and if the subframe is not part of a configured measurement gap:—monitor the PDCCH; and—if the PDCCH indicates a downlink transmission or if a downlink assignment has been configured for this subframe:

start the HARQ Round Trip Time (RTT) Timer for a corresponding HARQ process; and—stop the DRX-Retransmission Timer for the corresponding HARQ process.

If the PDCCH indicates a new transmission, downlink or uplink:—start or restart the DRX-Inactivity Timer.

When not in Active Time, type-0-triggered SRS shall not be reported.

This means that the timers above are stopped or started by events such as reception of a PDCCH grant or assignment, or Downlink (DL) Shared Channel (SCH) transmissions.

There is also a DRX command MAC control element that may put the user equipment directly out of active time. Some of these events are not known to the user equipment in advance and hence the user equipment may be in active time in t=n and not know that it will no longer be in active time in t=n+1 due to, e.g., transmissions from the network.

Regardless of whether the user equipment is monitoring PDCCH or not, the user equipment receives and transmits HARQ feedback and transmits type-1-triggered SRS when such is expected.

Layer-1 Details of Periodic SRS and PUCCH A/N

Due to a single-carrier property of the Release-8 LTE uplink, special rules apply when the timing is such that two uplink transmissions would otherwise coincide, e.g., 1) HARQ A/N acknowledgement ("ack" or "A")/negative acknowledgement ("nack" or "N") for a downlink transmission at the same time as a periodic CSI report, or 2) a PUSCH transmission at the same time as an SRS transmission.

Concerning the foregoing in more detail:

A HARQ A/N on PUCCH for a downlink transmission is transmitted on layer 1 using PUCCH format 1a/1b. 1a/1b are formats for sending one and two bits of A/N info, respectively. If coinciding in time with a periodic CSI report, the HARQ A/N and the periodic CSI report are multiplexed and transmitted using PUCCH format 2a/2b. 2a/2b are formats for sending periodic CSI report and optionally multiplexed A/N info.

A PUSCH transmission normally uses all symbols of a subframe. If coinciding in time with a periodic SRS transmission, which uses the last symbol of the subframe, the PUSCH transmission is punctured such that all symbols but the last are used for PUSCH and in the last symbol, SRS is transmitted instead of PUSCH. The puncturing of PUSCH occurs whenever the PUSCH coincides in frequency with the cell SRS bandwidth, regardless of whether or not the user equipment is itself transmitting SRS, and whenever the user equipment is itself transmitting SRS, regardless of the frequency location of the PUSCH transmission.

However, a disadvantage is that if transmissions in a subframe n end active time or start active time in subframe n, the existing rule that the user equipment decides what to transmit based on the DRX status in subframe n, not yet known in the user equipment, does not allow processing time for this user equipment, which makes it hard to implement the solution above.

SUMMARY

It is therefore an object of embodiments herein to provide an improved way of handling uplink transmissions in a user equipment configured with DRX.

According to a first aspect of embodiments herein, the object is achieved by a method in a user equipment for deciding whether or not to send an uplink transmission to a radio access network node. The user equipment and radio access network node are comprised in a communications network. The user equipment is configured with Discontinuous Reception, DRX, to be in active time or not be in active time. The user equipment decides whether or not to send the uplink transmission at a transmission time t, based on whether the user equipment was in active time or not at a predefined earlier time instance relative to the transmission time t.

According to a second aspect of embodiments herein, the object is achieved by a user equipment for deciding whether or not to send an uplink transmission to a radio access network node. The user equipment and radio access network node are intended to be comprised in a communications network. The user equipment is configured with Discontinuous Reception, DRX, to be in active time or not be in active time. The user equipment comprises a second, layer entity configured to decide whether or not to send the uplink transmission at a transmission time t, based on whether the user equipment was in active time or not at a predefined earlier time instance relative to the transmission time t.

Since the decision whether or not to send the uplink transmission at a transmission time t, is based on whether the user equipment was in active time or not at a predefined earlier time instance relative to the transmission time t, the user equipment gets enough time until the time t, to allow the user equipment the processing time required.

This results in an improved way of handling uplink transmissions in a user equipment configured with DRX.

With these embodiments, the user equipment is requested to send uplink transmission at certain well defined times and these transmission times are also known by the radio access network node, which means that it is possible to convey signaling information from the user equipment to the radio access network node in a predictable way, and thereby avoid any optional behavior which would allow the user equipment to not perform uplink transmission when the signaling information from the user equipment is needed.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. Examples of embodiments herein are described in more detail with reference to attached drawings in which.

DETAILED DESCRIPTION

Figure 1:
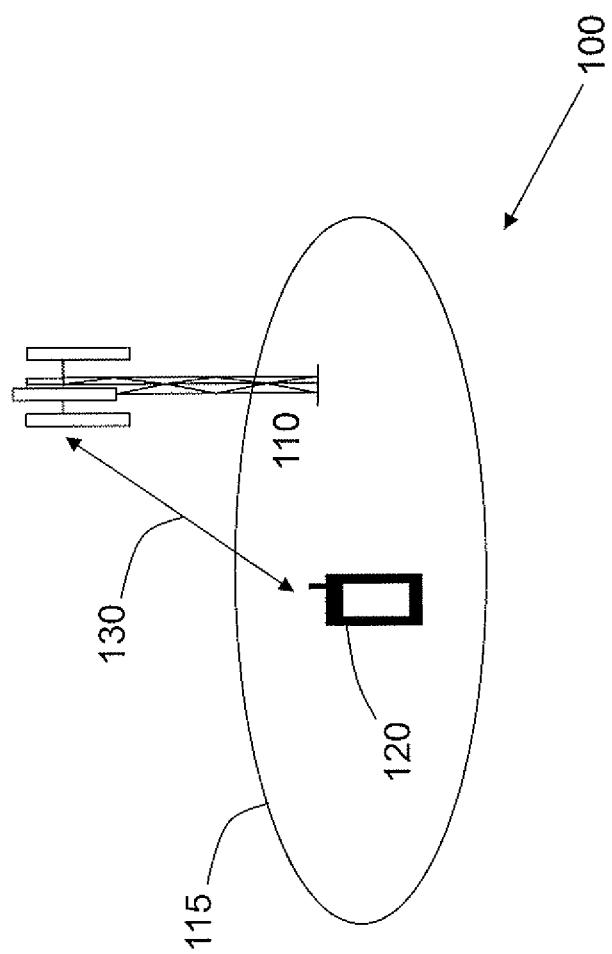
FIG. 1 is a schematic block diagram illustrating a communications network.

Embodiments will be exemplified in the following non-limiting description.

As part of evaluation of embodiments herein, a problem shall first be identified and discussed. A user equipment always requires time to process commands, signalling, or bits that it receives from a radio access network node serving the user equipment, before the user equipment can act on the received information such as new transmissions or grants for new transmissions or commands to stop active time. Consequently, even if transmissions in a subframe n end active time or start active time in subframe n, the user equipment will not know that it is indeed in active time until a subframe n+x for some positive value of x. In addition to the processing delay on received information, the user equipment also needs processing time to prepare its uplink transmissions, i.e. its transmissions to the radio access network node. Hence, if an uplink transmission is due in subframe n, the user equipment will need to know in advance, in subframe n−y for some positive value of y, what the user equipment is supposed to transmit. The existing rule that the user equipment decides what to transmit based on the DRX status in subframe n, not yet known in the user equipment, does not allow for this user equipment processing time to prepare for the transmission.

Some degree of freedom is needed in what the user equipment is expected to transmit after an active time has ended or has started or has been prolonged, due to an event from the radio access network node not known in the user equipment until the event which caused the change in active time has been made known in the user equipment. In the LTE MAC protocol, there is an exception on the PUCCH CSI reporting, such exception being quoted as follows:

A user equipment may optionally choose to not send CQI/PMI/RI/PTI reports on PUCCH and/or type-0-triggered SRS transmissions for up to 4 subframes following a PDCCH indicating a new uplink or downlink transmission received in the last subframe of an active time. A choice not to send CQI/PMI/RI/PTI reports on PUCCH and/or type-0-triggered SRS transmissions is not applicable for subframes where an on duration timer is running.

The radio access network node expects transmissions from the user equipment according to the standard. For example, if the user equipment is in active time in subframe n, it is expected to transmit periodic CSI on the PUCCH and it is expected to transmit sounding reference signals SRS, if CSI or SRS is due, even if the user equipment is in active time due to a recent prolongation of active time from the reception of a new downlink assignment or uplink grant. Also, if the user equipment is not in active time in subframe n, it is expected not to transmit periodic CSI on PUCCH and it is expected not to transmit SRS when such is due, even if the user equipment has just recently been put in non-active time. If the user equipment is, in addition, expected to transmit a HARQ A/N for a downlink transmission, or a PUSCH transmission, the selection of format for the HARQ A/N together with the PUSCH depends on if the user equipment is in active time or not. HARQ A/N together with a PUSCH transmission will not change depending on active time. But for PUCCH, if a CSI is sent or not, depending on active time, and together with a HARQ A/N the format will be different. Format 2a/2b may be used if both HARQ A/N and CSI is sent, and format 1a/1Bb may be used if only HARQ A/N is sent.

Hence, the decoding in the eNB, relies on the uplink transmission having a certain format. The problem is that the decoding fails if the format assumed is not correct.

Embodiments herein relate to telecommunications and particularly to uplink (UL) transmissions over a radio or air interface from a user equipment.

According to an aspect of the technology of embodiments disclosed herein, for uplink transmissions, instead of acting according to the DRX status, being in active time or not being in active time, at the time of the actual uplink transmission, the user equipment may decide the format and the sending or not sending certain uplink transmissions such as SRS, PUCCH CSI and PUCCH A/N, based on the DRX status of an earlier, predefined time instance, with a fixed, known offset to the time of transmission. This shift in time reference removes the dependency on a future state, the state at actual transmission, for the user equipment when preparing an uplink transmission.

As possible, but not necessary limiting, example features, the shift in time reference may be applied only when the resulting uplink transmission coincides in time with another uplink transmission from the same user equipment and/or only when there has been a change in DRX status due to signaling from the network, i.e. from the radio access network node. The above two example features may be applied separately, one not requiring the other, or both at the same time.

FIG. 1 depicts a communications network 100 in which embodiments herein may be implemented. The communications network 100 is a wireless communication network such as an LTE network or any 3GPP cellular network, Wimax, Wi-Fi or any cellular or wireless network or system.

The communications network 100 comprises one or more radio network nodes such as a radio access network node 110. The radio access network node 110 serves a cell 115. The radio access network node 110 is an access point that may be a radio base station. The logical function(s) provided by such a radio base station may be e.g. the functions of an eNB, an eNodeB, or a Home NodeB, a Home eNode B, or any other network nodes capable to serve a user equipment or a machine type communication device in a wireless network.

Figure 3:
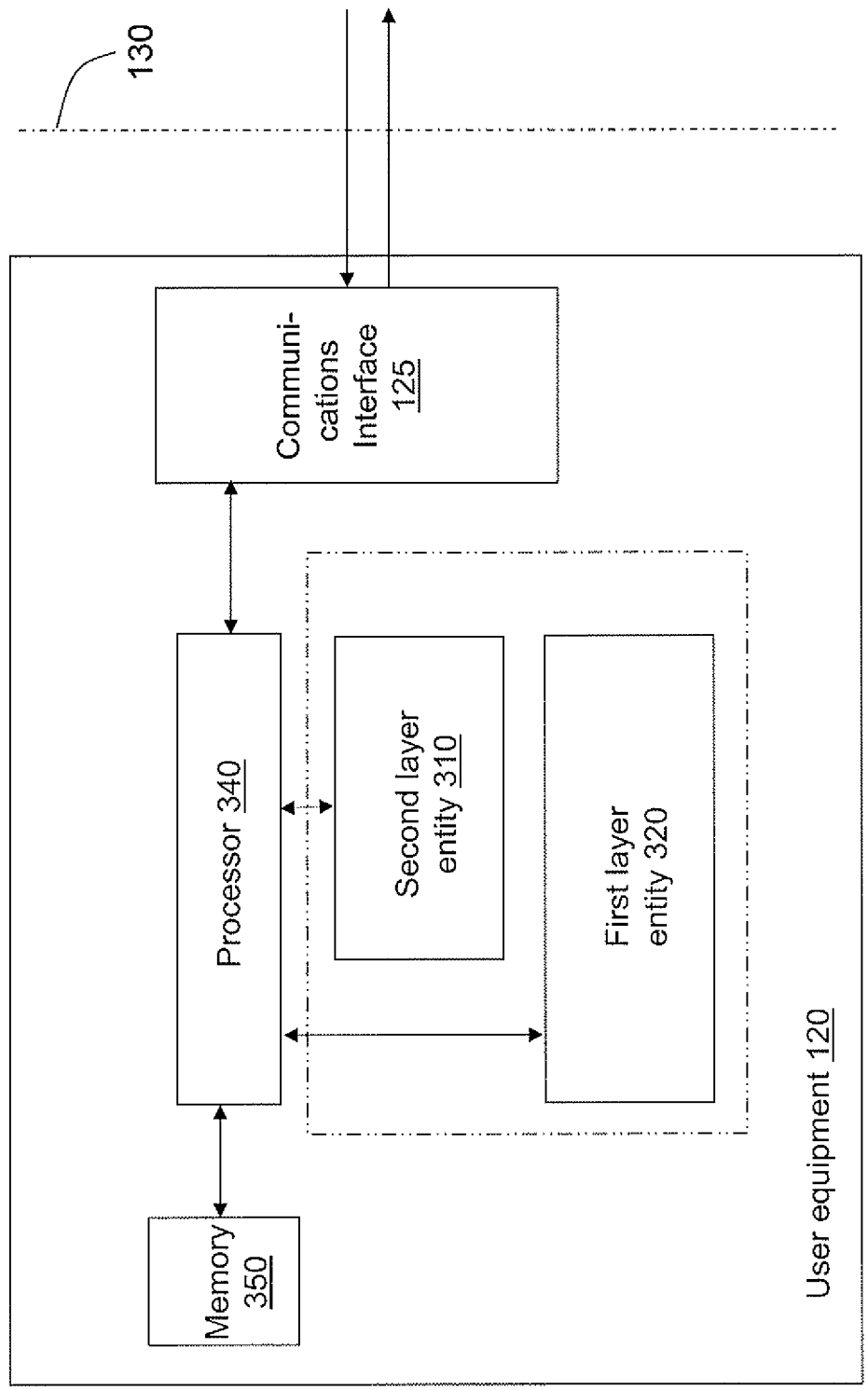
FIG. 3 is a schematic block diagram illustrating embodiments of a user equipment.

The communications network 100 further comprises a user equipment 120. The user equipment 120 is served by the radio access network node 110 when the user equipment 120 is located in the cell 115. The user equipment 120 user equipment comprises a communications interface 125 (which is shown in FIG. 3) adapted to communicate with the radio access network node over a radio link 130.

As used herein, the user equipment 120 may be referred to as terminal or wireless terminal which may be a mobile station such as a mobile telephone, a cellular telephone, a laptop or surf plate with wireless capability, e.g., mobile termination, and thus may be, for example, a portable, pocket, hand-held, computer-included, or car-mounted mobile device which communicates voice and/or data via a radio access network. Moreover, the user equipment 120 may be a fixed terminal which communicates voice and/or data via a radio access network.

In example embodiments of such methods and apparatus the user equipment 120 decides on and transmits uplink control signaling and/or sounding reference signals to the radio access network node 110 over the radio or air interface 130.

The user equipment 120 is configured with DRX to be in active time or not be in active time. E.g. When on DurationTimer is running, the user equipment is in active time. When on DurationTimer is not running, the user equipment may be in active time or not in active time, depending on other timers and other conditions.

The UE 120 may selectively or intermittently enter active time to communicate with the radio access node 110, and otherwise stays in sleep mode or inactive time.

In an example embodiment and mode the radio access network signaling may incur a start or stop of a DRX timer, starting or ending active time, or the radio access network signaling may be a DRX command MAC control element ending active time.

Figure 2:
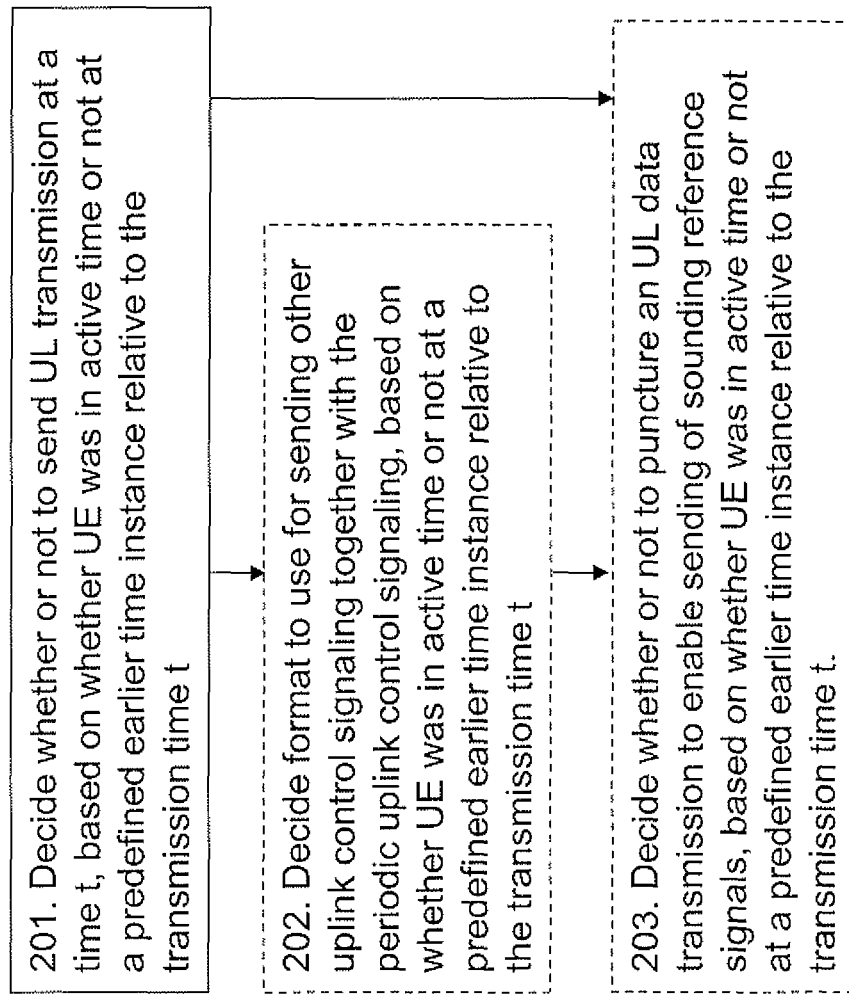
FIG. 2 is a flowchart depicting embodiments of a method in a user equipment.

Embodiments of a method in the user equipment 120 for deciding whether or not to send an uplink transmission to the radio access network node 110, will now are described with reference to a flowchart depicted in FIG. 2. As mentioned above the user equipment 120 and radio access network node 110 are comprised in the communications network 100. The user equipment 120 is configured with DRX to be in active time or not be in active time. The method comprises the following actions, which actions may be taken in any suitable order. Dashed lines of some boxes in FIG. 4 indicate that this action is not mandatory.

Action 201

The user equipment 120 decides whether or not to send the uplink transmission at a transmission time t. This decision is according to embodiments herein based on whether the user equipment 120 was in active time or not at a predefined earlier time instance relative to the transmission time t. t represents the point in time when the transmission shall be performed. According to some embodiments this means that the decision is based on a DRX status of an earlier, predefined time instance, with a fixed, known offset to the time of transmission. I.e. earlier than the transmission time t, for example 0, 1-10 ms, typically 1-4 ms earlier than the transmission time t. This decision being based on a DRX status earlier than the time t removes the dependency on a future state, i.e. the state at actual transmission at the time t, for the user equipment 120 when preparing an uplink transmission. The decision instead relies on a current state.

In some embodiments, the uplink transmission comprises periodic uplink control signaling and/or transmission of a sounding reference signal. Periodic uplink control signaling may be periodic CSI and a sounding reference signal may be a predefined signal used to measure the user equipment's channel.

The periodic uplink control signaling may comprise CSI, comprising all of or any subsets of CQI, PMI, RI and PTI.

Action 202

Based on whether the user equipment 120 was in active time or not at the predefined earlier time instance relative to the transmission time t, the user equipment 120 may decide a format to use for sending other uplink control signaling together with the periodic uplink control signaling. This overcomes the problem of unknown or wrong format leading to problems with decoding in the base station 110. The format may e.g. be format 301a, format 1b, format 2a, format 2b, etc. In some embodiments the other uplink control signaling comprises HARQ and/or A/N feedback.

Action 203

In some embodiments the user equipment 120 decides whether or not to puncture an uplink data transmission to enable sending of sounding reference signals, based on whether the user equipment 120 was in active time or not at a predefined earlier time instance relative to the transmission time t.

The uplink data transmission may be sent on a PUSCH.

In some of these embodiments a last symbol of the uplink data transmission to be sent on a PUSCH is punctured to enable sending of sounding reference signals in the last symbol.

In some embodiments, any of the action steps 201, 202 or 203 above that are based on whether the user equipment 120 was in active time or not at a predefined earlier time instance relative to the transmission time t, are applied at time instances when there are other uplink transmissions from the user equipment 120 to the radio access network node 110 coinciding in time. In some embodiments said actions 201, 202, 203 are performed only in these time instances.

In some embodiments any of the action steps 201, 202, 203 being based on whether the user equipment 120 was in active time or not at a predefined earlier time instance relative to the transmission time t, are applied at time instances when there has been a change in the active time such as e.g. prolongation of active time or end of active time, due to radio access network node signaling or radio access network node data transmission to the user equipment 120. In some embodiments said action steps 201, 202, 203 are performed only in these time instances.

The above two example features may be applied separately, one not requiring the other, or both at the same time.

In the embodiments wherein said actions 201, 202, 203 are performed only in the above mentioned time instances, the decision and transmission of uplink control signaling and/or sounding reference signals at other time instances than the above mentioned time instances, may be based on the user equipment 120 being in active time or not at the transmission time t.

As mentioned above, for uplink transmissions according to embodiments disclosed herein, instead of acting according to the DRX status, being in active time or not being in active time, at the time of the actual uplink transmission, the user equipment may decide the format and the sending or not sending certain uplink transmissions such as SRS, PUCCH CSI and PUCCH A/N, based on the DRX status of an earlier, predefined time instance, with a fixed, known offset to the time of transmission. This shift in time reference, removes the dependency on a future state for the user equipment when preparing an uplink transmission. In this way a practically realisable way of handling uplink transmissions is provided which implies a more efficient way of using a spectrum in a wireless network. In this way the handling uplink transmissions in a user equipment configured with DRX has been improved.

To perform the method actions for deciding whether or not to send an uplink transmission to the radio access network node 110 described above in relation to FIG. 2, the user equipment 120 comprises the following arrangement depicted in FIG. 3. FIG. 3 depicts by a broken, double-dotted line, means to perform actions such as the actions 201, 202 and/or 203. As mentioned above, the user equipment 120 and the radio access network node 110 are intended to be comprised in the communications network 100. The user equipment 120 is configured with DRX to be in active time or not be in active time.

The user equipment 120 comprises a second layer entity 310 configured to decide whether or not to send the uplink transmission at a transmission time t, based on whether the user equipment 120 was in active time or not at a predefined earlier time instance relative to the transmission time t. The uplink transmission may comprise periodic uplink control signaling and/or transmission of a sounding reference signal. The second layer entity may be a MAC layer entity.

The periodic uplink control signaling may comprise CSI comprising all of or any subsets of CQI, PMI, RI and, PTI.

In some embodiments, the second layer entity 310 is further configured to decide whether or not to puncture an uplink data transmission to enable sending of sounding reference signals, based on whether the user equipment 120 was in active time or not at a predefined earlier time instance relative to the transmission time t. The uplink data transmission may be intended to be sent on a PUSCH. In some of these embodiments a last symbol of the uplink data transmission intended to be sent on a PUSCH may be punctured to enable sending of sounding reference signals in the last symbol.

The user equipment 120 may further comprise a first layer entity 320 configured to decide a format to use for sending other uplink control signaling together with the periodic uplink control signaling, based on whether the user equipment 120 was in active time or not at a predefined earlier time instance relative to the transmission time t. In some embodiments the other uplink control signaling comprises HARQ, and/or A/N, feedback. The first layer entity 320 may be a physical layer entity.

The second layer entity 310 and/or the first layer entity 320 may further be configured to perform the decisions being based on whether the user equipment 120 was in active time or not at a predefined earlier time instance relative to the transmission time t, at time instances when there are other uplink transmissions from the user equipment 120 to the radio access network node 110 coinciding in time.

The second layer entity 310 and/or the first layer entity 320 may further be configured to perform the decisions being based on whether the user equipment 120 was in active time or not at a predefined earlier time instance relative to the transmission time t, at time instances when there has been a change in the active time due to radio access network node 110 signaling or radio access network node data transmission to the user equipment 120.

The above two example features may be applied separately, one not requiring the other, or both at the same time.

In the example embodiment of FIG. 3, the broken, double-dotted line may also depict the fact that the second layer entity 310 such as the MAC layer entity and the first layer entity 320 such as the physical layer entity may comprise, be realized by, and/or be included in electronic circuitry and particularly by a platform, such platform being framed by the broken, double-dotted line. The terminology "platform" is a way of describing how the functional units or entities framed thereby may be implemented or realized by machine including electronic circuitry. One example platform is a computer implementation wherein one or more of the framed elements are realized by one or more processors such as a processor 340 which execute coded instructions and which use non-transitory signals in order to perform the various acts described herein. In such a computer implementation the user equipment 120 may comprise, in addition to the processor(s), a memory section, such as a memory 350 which in turn may comprise a random access memory; a read only memory; an application memory; and any other memory such as cache memory, for example. The memory section, e.g., the application memory, may store, e.g., coded instructions which may be executed by the processor to perform acts described herein. The platform may also comprise other input/output units or functionalities, such as a keypad; an audio input device, e.g., microphone; a visual input device, e.g., camera; a visual output device; and an audio output device, e.g., a speaker. Other types of input/output devices may also be connected to or comprise the user equipment 120. Another example platform suitable for the user equipment 120 is that of a hardware circuit, e.g., an application specific integrated circuit (ASIC) wherein circuit elements are structured and operated to perform the various acts described herein.

The following is applicable to any of the embodiments above.

Implementation of Embodiments Herein According to LIE MAC

A possible way to implement embodiments disclosed herein in the LTE MAC specification 36.321 section 5.7 for DRX is shown below, with underlining showing modifications according to embodiments herein, to the existing specification When DRX is configured, the user equipment 120 referred to as UE 120 below, shall for each subframe:

when not in Active Time in subframe n−k, where k is the most recent in time in the set K, type-0-triggered SRS shall not be reported. K is defined in Table 10.1.3.1-1 in 3GPP TS 36.213 V10.1.0 from the MAC specification (2011-03) see below. Set K defines the subframes where a PDCCH may have occurred for a PDSCH transmission, occurred here means a PDCCH indicating a transmission UL or DL.

if CQI masking (cqi-Masn k) is setup by upper layers:
    when on DurationTimer is not running, CQI/PMI/RI/PTI on PUCCH shall not be reported. —else:
    when not in Active Time in subframe n−k, where k is the most recent in time in the set K, CQI/PMI/RI/PTI on PUCCH shall not be reported.

Regardless of whether the UE 120 is monitoring PDCCH or not, the UE 120 receives and transmits HARQ feedback and transmits type-1-triggered SRS when such is expected.

what timers are running or not running or other conditions, which can however be summarized as "the user equipment 120 is in active time" or "the user equipment is not in active time". For k set such that n−k equals the point in time when the grant was received for the PUSCH transmission, or when the PDSCH transmission resulting in the HARQ A/N was received, the condition may also be written as the user equipment 120 being in active time when the grant was

TABLE 10.1.3.1-1

Downlink association set index K: $\{k_0, k_1, \ldots k_{M-1}\}$ for TDD

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

NOTE: The UE 120 may optionally choose to not send CQI/PMI/RI/PTI reports on PUCCH and/or type-0-triggered SRS transmissions for up to 4 subframes following a PDCCH indicating a new Uplink (UL) or Downlink (DL) transmission, received in subframe n−i, where n is the last subframe of Active Time and i is an integer value from 0 to 3. After Active Time is stopped due to the reception of a PDCCH or a MAC control element the UE 120 may optionally choose to continue sending CQI/PMI/RI/PTI reports on PUCCH and/or SRS transmissions for up to 4 subframes. The choice not to send CQI/PMI/RI/PTI reports on PUCCH and/or type-0-triggered SRS transmissions is not applicable for subframes where on DurationTimer is running and is not applicable for subframes n−i to n, and is not applicable for subframes where the UE 120 is transmitting on UL-Shared Channel (SCH) or transmitting HARQ feedback on PUCCH.

For uplink transmissions according to embodiments disclosed herein, instead of acting according to the DRX status, being in active time or not being in active time, at the time of the actual uplink transmission, the user equipment may decide the format and the sending or not sending certain uplink transmissions such as SRS, PUCCH CSI and PUCCH A/N, based on the DRX status of an earlier, predefined time instance, with a fixed, known offset to the time of transmission. This shift in time reference, removes the dependency on a future state for the user equipment when preparing an uplink transmission. In this way a practically realisable way of handling uplink transmissions is provided which implies a more efficient way of using a spectrum in a wireless network. In this way the handling uplink transmissions in a user equipment configured with DRX has been improved.

Alternative Implementations of Embodiments Herein.

The technology disclosed herein comprises many embodiments and variations and example implementations. The subframe at the predefined earlier time instance relative to the transmission time t may be referred to as n−k. For example the "k" in "n−k" may be defined as any fixed, predefined value larger than zero, large enough to allow the user equipment 120 the processing time required.

Further, the condition on transmitting or not transmitting the CSI on PUCCH or the SRS may be stated in terms of received for the PUSCH transmission, or when the PDSCH transmission resulting in the HARQ A/N was received.

Moreover, with dynamic scheduling, the user equipment 120 has to monitor the PDCCH to receive dedicated information from the eNB, such as the radio access network node 110. Hence, normally the user equipment 120 is in active time when receiving the PDCCH. This means that when the user equipment 120 is scheduled with dynamic scheduling, as opposed to semipersistently scheduled, the condition on active time in the time when the downlink assignment or uplink grant was received, is equivalent to stating that periodic CSI and/or SRS shall be transmitted when coinciding with a HARQ A/N transmission or a PUSCH transmission, respectively. For semipersistent scheduling, the condition may be stated as "had the user equipment 120 been in active time at the point in time when the downlink assignment or uplink grant would have been received, had the user equipment 120 not been scheduled semipersistently. SPS does not have a grant/assignment but still causes the same UL/DL transmissions which need to be handled.

The embodiments of technology disclosed herein and encompassed hereby has numerous advantages. Example, non-limiting advantages include:

Providing the user equipment 120 enough time to prepare an uplink transmission.

Resulting in a known, predefined uplink transmission for the user equipment, such that the network knows how to decode the uplink transmission. According to prior art, a radio access network node trying to decode an uplink transmission with the wrong assumption will most likely lead to failure to decode the transmission. If a HARQ A/N is not received, unnecessary retransmissions or not enough retransmission of a packet will follow. If a PUSCH transmission is not decoded correctly, unnecessary retransmissions follow, possibly also leading higher-layer (RLC) retransmissions. This will not happen in radio access networks designed according to embodiments herein.

For example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." When using the word "comprise" or "comprising" it shall be interpreted as non-limiting, i.e. meaning "consist at least of". All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

In the description above, for purposes of explanation and not limitation, specific details are set forth such as particular architectures, interfaces, techniques, etc. in order to provide a thorough understanding of the embodiments herein. However, it will be apparent to those skilled in the art that the present invention may be practiced in other embodiments that depart from these specific details. That is, those skilled in the art will be able to devise various arrangements which, although not explicitly described or shown herein, embody the principles of the embodiments herein and are included within its scope. In some instances, detailed descriptions of well-known devices, circuits, and methods are omitted so as not to obscure the description of the embodiments herein with unnecessary detail. All statements herein reciting principles, aspects, and embodiments of the embodiments herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method in a user equipment for deciding whether or not to send an uplink transmission to a radio access network node at a transmission time t in a subframe n, the user equipment and the radio access network node being comprised in a communications network, and the user equipment being configured with Discontinuous Reception (DRX) to be in active time or not to be in active time, the method comprising:
deciding whether or not to send the uplink transmission, based on whether the user equipment was in active time or not during a subframe n–k, where k is a fixed, predefined value larger than zero.

2. The method according to claim 1, wherein the uplink transmission comprises at least one of periodic uplink control signaling and transmission of a sounding reference signal.

3. The method according to claim 2, wherein the periodic uplink control signaling comprises Channel State Information (CSI), comprising all of or any subsets of Channel Quality Indication (CQI), Precoding Matrix Indicator (PMI), Rank Indication (RI) and Precoder Type Indicator (PTI).

4. The method according to claim 2, further comprising:
deciding a format to use for sending other uplink control signaling together with the periodic uplink control signaling, based on whether the user equipment was in active time or not during the subframe n–k.

5. The method according to claim 4, wherein the other uplink control signaling comprises at least one of Hybrid Automatic Repeat ReQuest (HARQ) feedback and Acknowledgement/Not acknowledgement (A/N) feedback.

6. The method according to claim 1, wherein the uplink transmission comprises a sounding reference signal transmission and wherein the method further comprises deciding whether or not to puncture an uplink data transmission coinciding with the transmission time t with the sounding reference signal transmission, based on whether the user equipment was in active time or not during the subframe n–k.

7. The method according to claim 6, wherein the uplink data transmission is to be sent on a Physical Uplink Shared Channel (PUSCH).

8. The method according to claim 6, wherein, when the decision is made to puncture the uplink data transmission with the sounding reference signal transmission, the method includes puncturing a last symbol of the uplink data.

9. The method according to claim 1, wherein the method further comprises deciding whether or not to send the uplink transmission in further dependence on whether another uplink transmission from the user equipment coincides with the transmission time t.

10. The method according to claim 1, wherein deciding whether or not to send the uplink transmission, based on whether the user equipment was in active time or not during the subframe n–k is conditioned on whether there has been a change in the active time, due to radio access network node signaling or radio access network node data transmission to the user equipment.

11. A user equipment configured for operation in a communications network and comprising:
   radio circuitry configured for communicating with the communications network; and
   a processing circuit operatively associated with the radio circuitry and configured to:
      operate the user equipment in a Discontinuous Reception (DRX) configuration that defines when the user equipment is in active time and not in active time; and
      decide whether or not to send an uplink transmission to a radio access network node in the communications network at a transmission time t in a subframe n, based on whether the user equipment was in active time or not during a subframe n−k, where k is a fixed, predefined value larger than zero.

12. The user equipment according to claim 11, wherein the uplink transmission comprises at least one of a periodic uplink control signaling and transmission of a sounding reference signal.

13. The user equipment according to claim 12, wherein the periodic uplink control signaling comprises Channel State Information (CSI), comprising all of or any subsets of Channel Quality Indication (CQI), Precoding Matrix Indicator (PMI), Rank Indication (RI), and Precoder Type Indicator (PTI).

14. The user equipment according to claim 12, wherein the processing circuit is configured to decide a format to use for sending other uplink control signaling together with the periodic uplink control signaling, based on whether the user equipment was in active time or not during the subframe n−k.

15. The user equipment according to claim 14, wherein the other uplink control signaling comprises at least one of Hybrid Automatic Repeat ReQuest (HARQ) feedback and Acknowledgement/Not acknowledgement (A/N) feedback.

16. The user equipment according to claim 11 wherein the uplink transmission comprises a sounding reference signal transmission and wherein the processing circuitry is configured to decide whether or not to puncture an uplink data transmission coinciding with the transmission time t with the sounding reference signal transmission, based on whether the DRX status of the user equipment was in active time or not during the subframe n−k.

17. The user equipment according to claim 16, wherein the uplink data transmission is to be sent on a Physical Uplink Shared Channel (PUSCH).

18. The user equipment according to claim 16, wherein, when the processing circuit decides to puncture the uplink data transmission, the processing circuit is configured to puncture a last symbol of the uplink data transmission with the sounding reference signal transmission.

19. The user equipment according to claim 11, wherein the processing circuit is configured to decide whether or not to send the uplink transmission in further dependence on whether or not another uplink transmission from the user equipment coincides with the transmission time t.

20. The user equipment according to claim 11, wherein the processing circuitry is configured to base its decision about whether or not to send the uplink transmission on whether or not the user equipment was in active time or not during the subframe n−k in dependence on whether there has been a change in the active time due to radio access network node signaling or radio access network node data transmission to the user equipment.

* * * * *

UNITED STATES PATENT AND TRADEMARK OFFICE
CERTIFICATE OF CORRECTION

PATENT NO. : 9,668,207 B2  
APPLICATION NO. : 14/238393  
DATED : May 30, 2017  
INVENTOR(S) : Östergaard et al.

Page 1 of 1

It is certified that error appears in the above-identified patent and that said Letters Patent is hereby corrected as shown below:

In the Specification

In Column 1, Line 65, delete "DTX" and insert -- DRX --, therefor.

In Column 3, Line 44, delete "if the" and insert -- If the --, therefor.

In Column 8, Line 33, delete "301a," and insert -- 1a, --, therefor.

In Column 10, Line 52, delete "LIE" and insert -- LTE --, therefor.

In Column 11, Line 58, delete "Herein." and insert -- Herein --, therefor.

In the Claims

In Column 16, Lines 10-11, in Claim 16, delete "whether the DRX status of the" and insert -- whether --, therefor.

In Column 16, Line 31, in Claim 20, delete "time" and insert -- time, --, therefor.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*